FINN A. HALS
INVENTOR.

United States Patent Office 3,439,196
Patented Apr. 15, 1969

3,439,196
METHOD OF SUPPLYING ELECTRIC POWER AND THERMAL FIXATION OF NITROGEN
Finn A. Hals, Lexington, Mass., assignor to Avco Corporation, Cincinnati, Ohio, a corporation of Delaware
Filed Sept. 29, 1965, Ser. No. 491,189
Int. Cl. H02k 45/00; G21d 7/02
U.S. Cl. 310—11                                      5 Claims

ABSTRACT OF THE DISCLOSURE

There is disclosed a method of producing electrical power and nitric oxide in a magnetohydrodynamic generator environment wherein excess oxygen for combustion is provided during off-peak periods whereby maximum generator efficiency is provided during peak power periods and this efficiency is decreased during off-peak periods to permit maximum production of nitric oxide.

---

Figure 1:
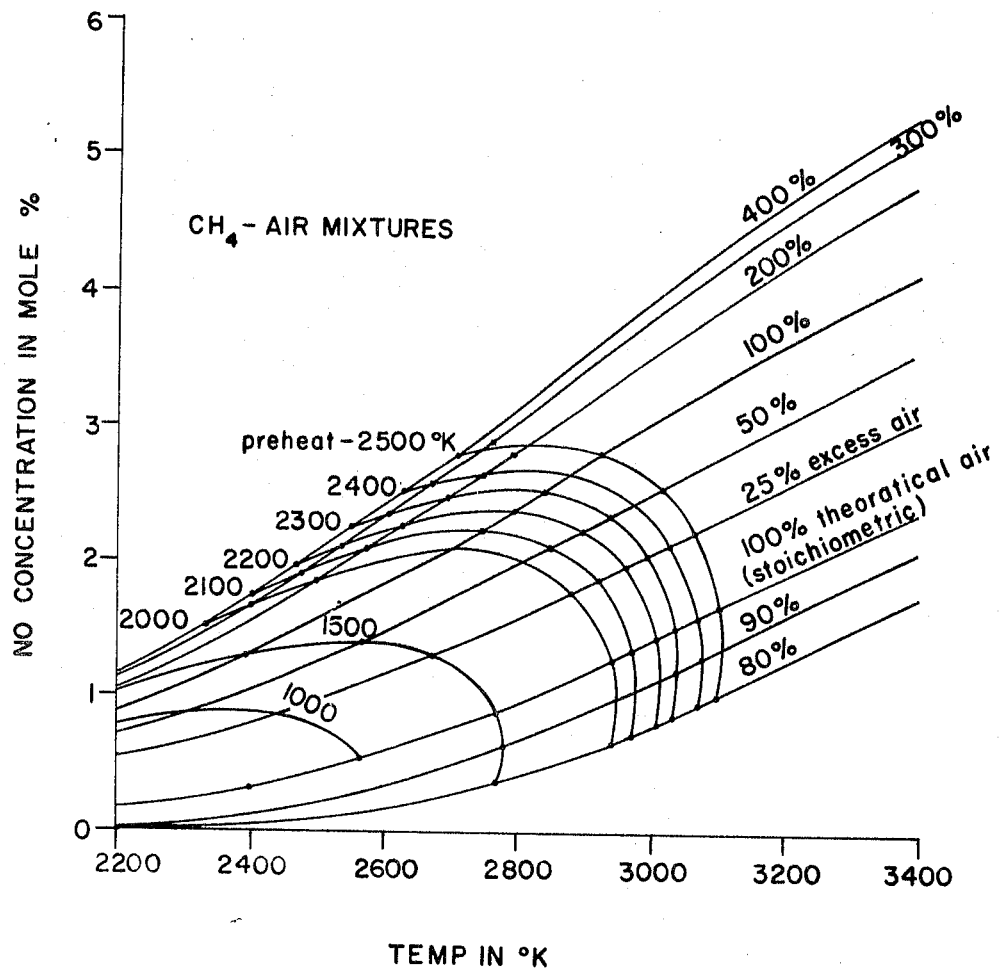

This invention relates to a method of generating electric power and more particularly to an improved method of supplying electrical power and thermal fixation of nitrogen.

If air containing molecular nitrogen and oxygen is heated to a very high temperature, a small percentage of nitric oxide (NO) is formed according to the reaction $N_2+O_2 \rightleftarrows 2NO$. The equilibrium percentage of nitric oxide formed is a function of temperature. Thus, as the temperature goes up, the percentage of nitric oxide formed also goes up. As is also well known in the art of thermal fixation of atmospheric nitrogen, if the hot gas containing the nitric oxide is cooled very rapidly, the nitric oxide does not have time to decompose and the high temperature equilibrium concentration of nitric oxide is frozen or "fixed." The more rapid the cooling, the higher the yield of nitric oxide.

Magnetohydrodynamic (hereinafter referred to as "MHD") generators which operate with carbonaceous fuel, preheated air and alkali vapor seeding require stagnation temperatures in excess of 2500° K. because the electrical conductivity due to thermal ionization is otherwise insufficient for economical power generation. Under such conditions, atmospheric nitrogen and oxygen react to form nitric oxide. As pointed out hereinabove, stabilization against decomposition requires that the gaseous mixture be quenched at a rapid rate from these high temperatures and it has been found that nitric oxide freezes as the working fluid expands in the MHD channel while producing electric power. Thus, in prior art open cycle MHD power plants using fossil fuel as the energy source, nitric oxide is present to a negligible extent in the exhaust gas.

Stabilizing nitric oxide against decomposition requires that the gaseous mixture be quenched from its initial high temperature at a very rapid rate. A sufficiently fast quenching rate can be attained both in the expansion nozzle and the channel of an MHD generator while producing power. The temperature drop across the exansion nozzle and MHD generator is sufficient to stabilize a substantial portion of the nitric oxide in the products of combustion comprising the working gas.

So far as can be determined, U.S. Patent No. 1,443,091 issued Jan. 23, 1923 to Christian Petersen of Norway on an application filed Jan. 4, 1919, is the first and only U.S. patent issued to date on the production of nitric oxide in an MHD environment. Apparently, since then, no serious thought has been given to the production of nitric oxide in an MHD environment as is attested to by the apparent lack of issued patents and by the considerable albeit only partially successful technical efforts to achieve commercially practical fixation of thermal nitrogen by the electric arc process and the so-called "Wisconsin" or pebble bed process.

In the electric arc process, the air is heated to a high temperature, such as, for example, 3500° K., by an electric arc and the hot air is then cooled by heat exchange with cold air. This method of heat exchange is a relatively slow process and accordingly resulted in commercially impractical low yields of nitric oxide. Thus, the prior art electric arc process has been considered too costly for commercial purposes and accordingly, over the years, the electric arc process fell into disfavor and attention was directed to the pebble bed process.

In the pebble bed process, the heating is by combustion of fuel with air first preheated in a pebble bed and the cooling is by heat transfer to the pebbles of a second pebble bed. Cooling a gas by contact with a solid surface, while much faster than the heat exchange method through solids, is still relatively slow and the operating temperature is limited by the construction materials. Moreover, commercially satisfactory results have been obtained for only relatively short periods of time because the required operating temperature result in rapid deterioration of the pebble bed furnaces.

For a thorough discussion of all aspects of the electric arc process including the patent and factual history thereof, reference is made to "Fixed Nitrogen" by H. A. Curtis, American Chemical Society Monograph, the Chemical Catalog Company, Inc. (1932); for a thorough discussion of the pebble bed process, reference is made to "Wisconsin Process Pebble Bed Furnace Fixed Atmospheric Nitrogen" by E. D. Ermenc, Chemical Engineering Progress, vol. 52, No. 4, pp. 149–153, April 1956; and for an improvement in the electric arc process, reference is made to patent application, Ser. No. 392,779, filed Aug. 28, 1964, and assigned to the same assignee as this application.

In conventional electrical generating plants utilizing rotating generators, nitric oxide in the exhaust gases is considered to be a pollutant and efforts are made to prevent the generation of nitric oxide. The principal methods of preventing the fixation of nitric oxide are to maintain not more than a stoichiometric mixture of fuel and oxygen or air as the case may be and to avoid rapid cooling of the products of combustion.

In the case of an open cycle MHD generator using fossil fuels, it has until recently been thought that it was also necessary to provide a stoichiometric mixture to provide the maximum flame temperature and heat release and, hence, best utilization of the fuel with maximum electrical conductivity of the plasma or products of combustion since the electrical conductivity of the products of combustion is strongly dependent on temperature.

Combustion temperature is dependent upon the fuel-oxidizer mixture ratio and the temperature of the two reactants (fuel and oxidizer) before combustion. Preheating of the oxidizer which may be oxygen or air, as the case may be, increases the combustion temperature whereas the use of excess oxidizer (more oxygen or air than required for stoichiometric mixture) decreases the combustion temperature. The economics of recovering the fixed nitrogen appearing in the cooled combustion gases of an MHD generator are strongly dependent upon the concentration of nitrogen oxides in the exhaust gas. The higher the concentration of fixed nitrogen in the gas, the higher the yield and consequently the more favorable the economics for recovery of the fixed nitrogen. For a further discussion, reference is made to a paper entitled, "Fixed Nitrogen By-Products and Open Cycle MHD Generators," by W. T. Lindsay et al., International Symposium on Magnetohydrodynamic Electrical Power Generation, Organization for European Co-operation and Development, Nuclear Energy Agency, Paris, 1964.

The present invention is directed to a new and improved method of improving the efficiency of MHD generators utilizing products of combustion for supplying electric power wherein there are peak periods of demand and off-peak periods. The preferred embodiment of the invention contemplates providing between at least 50% and about 100% excess oxygen as compared to that required for substantial stoichiometric combustion; passing the products of combustion through an expansion nozzle and then through a magnetic field at supersonic velocities; and converting to heat a portion of the electric power produced by the generator during off-peak periods and supplying said heat to said products of combustion upstream of the expansion nozzle. Thus, during off-peak periods, the excess electric power which would not otherwise be utilized is returned to the plasma in the form of heat, not for the purpose of increasing the electrical conductivity of the plasma, but for increasing the yield of nitric oxide. While this return of energy to the plasma upstream of the expansion nozzle has the minor benefit of providing limited increases in electrical conductivity, it has the more important benefits of substantially increasing the yeld of nitric oxide, maintaining a constant load on the generator, and permitting the generator to be continuously and usefully operated at maximum rated load.

The general object of the invention is to provide a new and more efficient method of operating an MHD generator.

Another object of the invention is to provide a commercially practical method for generating electric power and thermal fixation of nitrogen.

A further object of the invention is to provide an improved method of magnetohydrohydrodynamically generating electric power and simultaneously producing nitric oxide.

Figure 2:
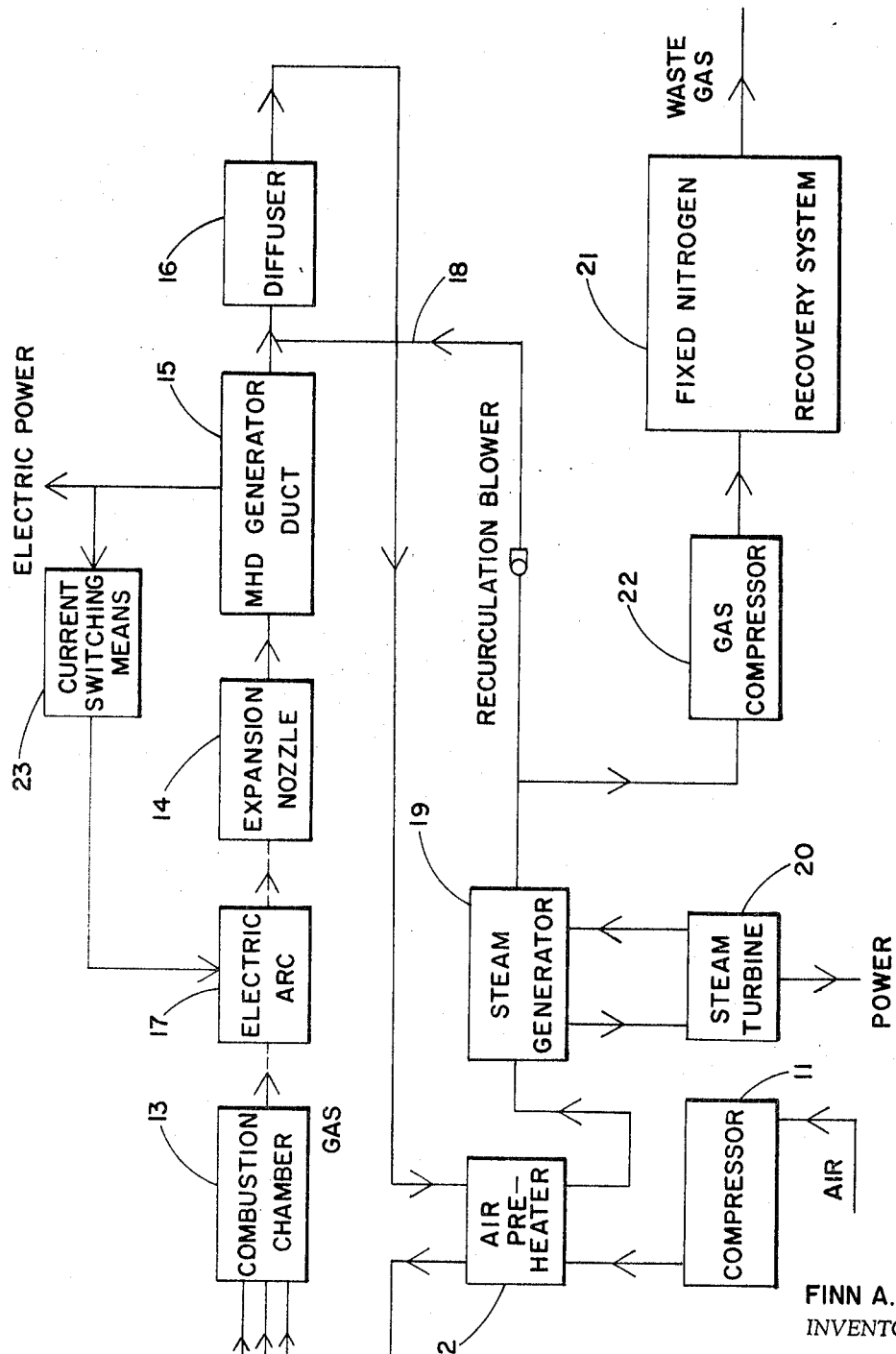

The novel features that are considered characteristic are set forth in the appended claims; the invention itself, however, both as to its organization and method of operation together with additional objects and advantages thereof will be best understood from the following description of a specific embodiment when read in conjunction with the accompanying drawings in which:

FIGURE 1 is a graphic representation of the influence which the ratio of natural gas and combustion air together with preheating of the combustion air has upon the adiabatic flame temperature and corresponding nitric oxide equilibrium concentration which is obtained for different fuel-air mixtures and preheat temperatures; and FIGURE 2 is a block diagram of apparatus for carrying out the invention.

Referring now to FIGURE 1, the fuel considered was natural gas with air at six atmospheres of pressure which is a typical cycle pressure for an MHD system. The curves extending from left to right in an upward direction indicate the equilibrium concentration of nitric oxide in the combustion products of natural gas and air as a function of temperature in degrees Kelvin for various concentrations of oxygen above and below the stoichiometric mixture using air (100% theoretical air). The curves curving sharply upward from right to left indicate the adiabatic flame temperature in degrees Kelvin and nitric oxide equilibrium concentration which is attained with the aforementioned different fuel-air mixtures for different air preheat temperatures.

Thus, from FIGURE 1, it can be seen for example that with a preheat temperature of air of 2000° K. and above, the nitric oxide concentration in the combustion products increases relatively steeply from stoichiometric conditions to about 50% excess air, whereas the nitric oxide concentration decreases sharply from stoichiometric conditions for fuel rich mixtures down to about 90–80% of the amount of air or oxygen required for a stoichiometric mixture. It can further be seen that the maximum nitric oxide concentration occurs between about 100% and 50% excess oxygen and that only a relatively small decrease in flame temperature occurs for a considerably larger range of increase of nitric oxide concentration. The use of coal or oil for fuel instead of natural gas leads to substantially the same results and conclusions as set forth hereinabove for natural gas. Natural gas produces clean combustion gases free of ash impurities and relatively high preheat temperatures in the order of 2000°–2100° K. can therefore more readily be attained than with other fuels. It was for these reasons that natural gas was selected as an illustrative example. Similar preheat temperature with other fuels containing ash impurities may be attained although this will be somewhat more difficult to achieve due, for example, to the ash impurities in the fuel.

Referring now to FIGURE 2 which is a schematic block diagram of apparatus for carrying out the invention, there is shown a conventional air compressor 11 for supplying ambient air at elevated pressures such as, for example, six atmospheres to a conventional regenerative preheater 12. The preheated air together with fuel and seed is supplied to combustion chamber 13. The fuel may be any fossil fuel, the seed an alkali metal which ionizes easily at the operating temperatures of the combustion chamber and the oxidizer ambient air or oxygen enriched air. While shown as separate blocks for convenience of description, the combustion chamber 13, expansion nozzle 14, MHD generator duct 15, and diffuser 16 are all integrally connected one to another and of conventional configuration, i.e., the products of combustion are received from the combustion chamber 13 by the expansion nozzle 14 and thereafter supplied to the MHD generator duct 15. After leaving the MHD generator duct, the high velocity gas is supplied to and decelerated in the diffuser 16. By way of example, the air may be compressed to six atmospheres and preheated to 3300° F. (2100° K. to provide at least about 50% excess air which is required to attain sufficiently high nitric oxide concentrations. Thus, with natural gas as fuel, for example, and 50% excess air, an adiabatic flame temperature of about 2800° K. is obtained with 2000° K. air preheat temperature which corresponds to a nitric oxide concentration in the combustion products of about 2% nitric oxide by volume. A typical temperature of the gas exiting from the diffuser 16 is about 2200° K. It is necessary to limit the maximum gas temperature in the diffuser to this temperature to avoid substantial decomposition of the nitric oxide formed at the higher combustion temperatures.

In order to provide sufficient nitric oxide fixation, it is necessary that the expansion nozzle 14 provide supersonic exit velocities. As the products of combustion expand through the conventional MHD generator duct 15, electrical energy is generated in conventional manner and the total enthalpy of the product of combustion decreases.

Typical values for pressure and velocity would be expansion from a combustion chamber pressure of six-eight atmospheres to gas velocities in the order of Mach 2. The static gas temperature after expansion in the nozzle 14 will be about 2100° K. and this very rapid cooling of the gas from the flame temperature of 2800° K. during the expansion process freezes or fixes a large percentage if not substantially all of the nitric oxide formed during the combustion process. The high velocity gas then passes through the MHD generator duct wherein electrical energy is extracted and the gas then enters the diffuser where it is decelerated. Since the residence time of the gas in the MHD generator duct is in the order of ten milliseconds or less, only a small or negligible fraction of the nitric oxide in the gas decomposes in the MHD generator duct.

The diffuser performs the principal function of recovering the remaining kinetic energy of the gas as pressure. Accordingly, in the diffuser the static temperature of the gas will therefore tend to rise somewhat notwithstanding heat loss from the gas to the diffuser walls. The temperature of the gas in the diffuser is principally dependent upon the combustion temperature and the amount of gas enthalpy that is extracted as electrical energy in the MHD generator duct as well as heat losses from the burner and to the walls in the MHD system. Where required, cool gas as compared to that entering the diffuser as indicated by arrow 18, can be recirculated from the low temperature part of the system and introduced in a suitable transition zone between the outlet end of the MHD generator duct and the diffuser inlet to prevent temperature rise or even provide a decrease in temperature of the gas in the diffuser during its deceleration. The use of gas recirculation is particularly advantageous because it avoids dilution of the nitric oxide concentration of the gas.

The seed which provides practical values of electrical conductivity in the gas of an MHD generator may be recovered for example by means of an electrostatic seed trap (not shown) or the like, disposed in the low temperature part of the system such as, for example, at the outlet of the steam generator 19. Condensation of alkalis or seed commences around 2000° F. Thus, the seed may be separated from the gas prior to introduction into the nitrogen recovery system. Similarly, impurities as well as seed may also be separated from the gas as by cyclone separators and the like.

After passing through diffuser 16, the gas is then passed through preheater 12 to preheat the incoming air and then is introduced into the steam generator 19 which may be used to drive a steam turbine 20 for further generation of electrical energy and/or production of power in order to improve the total heat balance and efficiency of the system. The proper arrangement and location of the different heat exchangers in the gas stream may be determined by consideration of such factors as the temperature to which the materials will be exposed, condensation of seed and possible chemical reactions between condensed seed and the materials employed, recovery of seed, and corrosion and fouling of heat transferring surfaces or media by the seed and and ash impurities in the gas.

After the gas has been cooled down to typical flue gas temperatures of power plants of 250–350° F., it is delivered to a conventional absorption system 21 for recovery of the fixed nitrogen as nitric acid. As previously noted, seed and impurities are removed prior to introduction of the gas into the fixed nitrogen recovery system. The cost of the recovery system 21 can be considerably reduced if the incoming gas is delivered under pressure up to about four atmospheres. This is due principally to the fact that delivery of the gas under pressure permits a substantial reduction in the size of the equipment that would be otherwise required.

Due to the operating characteristics of open cycle MHD generators which require a back pressure not substantially in excess of one atmosphere, the gas is therefore compressed in gas compressor 22 whereafter it is delivered to the recovery system 21. Part or all of the power required can be furnished by gas expansion engines (not shown) utilizing compressed gas from the recovery system with any additional power that may be necessary being supplied from the steam portion of the plant or the MHD generator itself.

The construction and operation of nitric oxide recovery systems is thoroughly discussed in the aforementioned Monograph entitled "Fixed Nitrogen" and the construction and operation of MHD generators is thoroughly discussed in the technical literature and patents. Accordingly, those skilled in the art are thoroughly familiar with the construction and operation of these components and a further discussion thereof is not believed necessary.

Little has previously been said about the electric arc 17. As is well known, electric arcs are not particularly efficient heat sources because of the power required for their operation. As is also well known, substantially all electrical power generating plants have peak periods, it being necessary to design the generating plant to meet the anticipated requirements of the peak period demands. Accordingly, during off-peak periods, the efficiency of the system is greatly reduced and the cost of operating the system per unit of power output is greatly increased. Thus, one would prefer, if possible, to operate continuously at the maximum rated output of the system. Heretofore, this has not been practically possible. Further, substantial fluctuations in load are particularly disadvantageous for systems utilizing MHD generators because of its operating characteristics with considerable decrease in overall system efficiency when the total load decreases.

In accordance with the invention, the electric arc 17 is supplied electric power from the MHD generator during the off-peak periods as by current sensing and switching means 23. As will now be evident, in this manner, the MHD generator may be continuously operated at substantially maximum rated output, the electrical power not required for conventional uses during off-peak periods being supplied to the electric arc, thereby preventing substantial fluctuations of the load on the generator. This also has the added and very important benefit of increasing the nitric oxide yield during the off-peak periods to still further increase the efficiency of the system and thereby lower operating costs. Since the gas upon entering the nozzle is sufficiently electrically conductive, the function of the electric arc is not to bring the conductivity of the gas up to any particular level let alone a satisfactory level, but to permit a further increase of the already high equilibrium concentration of nitric oxide in proportion to the then available but unused capacity of the generator to produce electrical power.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In the method of supplying electrical power wherein there are peak periods of demand and off-peak periods which comprises burning a fuel in an oxidizer comprising oxygen and nitrogen in a combustor to develop products of combustion having a temperature in excess of about 2500° K., accelerating said products of combustion in an expansion nozzle, and passing said accelerated products of combustion through a magnetic field to generate said electrical power, the improvement comprising:
    (a) providing during said off-peak periods between at least about 50% and about 100% excess oxygen as compared to that required for substantially stoichiometric combustion;
    (b) introducing said products of combustion into said magnetic field at supersonic velocities; and
    (c) converting a portion of said electrical power to heat during off-peak periods and supplying said heat to said products of combustion upstream of said expansion nozzle.

2. The combination as defined in claim 1 and additionally including the step of preheating the oxidizer prior to its introduction into the combustor.

3. The combination as defined in claim 1 wherein said portion of electrical power during off-peak periods is supplied to an electrical arc.

4. In the method of supplying electrical power wherein there are peak periods of demand and off-peak periods which comprises burning a fuel in an oxidizer comprising oxygen and nitrogen in a combustor to develop products of combustion having a temperature in excess of about 2500° K., accelerating said products of combustion in an expansion nozzle, and passing said accelerated products of combustion through a magnetic field to generate said electrical power, the improvement comprising:
  (a) providing only during said off-peak periods between at least about 50% and about 100% excess oxygen as compared to that required for substantially stoichiometric combustion;
  (b) introducing said products of combustion into said magnetic field at supersonic velocities; and
  (c) converting to heat at least a portion of the electrical power not required during off-peak periods and supplying said heat to said products of combustion upstream of said expansion nozzle.

5. The combination as defined in claim 4 and additionally including the steps of:

(a) cooling and reducing the velocity of the products of combustion downstream of said magnetic field; and
  (b) recovering nitric oxide from said cooled products of combustion.

References Cited

UNITED STATES PATENTS

| | | | |
|---|---|---|---|
| 1,443,091 | 1/1923 | Petersen | 23—163 |
| 3,149,915 | 9/1964 | Thomsen | 23—163 |
| 3,215,869 | 11/1965 | Hatsopoulos et al. | 310—11 |
| 3,223,860 | 12/1965 | Brill | 310—11 |
| 3,345,523 | 10/1967 | Grunwald | 310—11 |

DAVID X. SLINEY, *Primary Examiner.*